(12) United States Patent
Evans, V et al.

(10) Patent No.: US 9,736,383 B2
(45) Date of Patent: Aug. 15, 2017

(54) APPARATUS AND METHOD TO MAXIMIZE THE DISPLAY AREA OF A MOBILE DEVICE

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/165,887

(22) Filed: May 26, 2016

(65) Prior Publication Data

US 2017/0126979 A1    May 4, 2017

Related U.S. Application Data

(60) Provisional application No. 62/318,152, filed on Apr. 4, 2016, provisional application No. 62/300,631, filed
(Continued)

(51) Int. Cl.
*H04N 5/232* (2006.01)
*H04N 5/225* (2006.01)
(Continued)

(52) U.S. Cl.
CPC ..... *H04N 5/23293* (2013.01); *G02B 13/0065* (2013.01); *G02B 13/06* (2013.01);
(Continued)

(58) Field of Classification Search
None
See application file for complete search history.

(56) References Cited

U.S. PATENT DOCUMENTS

| 4,066,860 A | 1/1978 | Kawasaki |
| 6,238,771 B1 | 5/2001 | Nakao |

(Continued)

FOREIGN PATENT DOCUMENTS

EP    2326068 A1    5/2011

OTHER PUBLICATIONS

Evans V, David et al.; Office Action mailed on Feb. 27, 2017 in U.S. Appl. No. 15/090,574; 14 pages.
(Continued)

*Primary Examiner* — Roberto Velez
*Assistant Examiner* — Cynthia Segura
(74) *Attorney, Agent, or Firm* — Perkins Coie LLP

(57) ABSTRACT

The technology disclosed here maximizes the size of the display area associated with the mobile device by various camera placement. In one embodiment, the camera is placed inside the mobile device, and can pop outside the mobile device when the camera is activated. When the camera is inactive the camera retracts inside the mobile device, and becomes unnoticeable to the user. In another embodiment, the camera is integrated into the mobile device display as a camera icon. The integrated camera serves two purposes: to record pictures, and to act as a camera icon, that when selected activates the camera. By removing the camera from the front side of the mobile device, or by integrating the camera into the display screen of the mobile device, the size of the mobile device display screen can be increased.

30 Claims, 13 Drawing Sheets

Related U.S. Application Data on Feb. 26, 2016, provisional application No. 62/249,130, filed on Oct. 30, 2015.

(51) Int. Cl.
  *G02B 13/00* (2006.01)
  *G02B 13/06* (2006.01)
  *H04M 1/02* (2006.01)
  *H04M 1/725* (2006.01)

(52) U.S. Cl.
  CPC ..... *H04M 1/0264* (2013.01); *H04M 1/72527* (2013.01); *H04N 5/2254* (2013.01); *H04N 5/23238* (2013.01)

(56) References Cited

U.S. PATENT DOCUMENTS

| | | | |
|---|---|---|---|
| 6,301,487 B1 | 10/2001 | Nakamura et al. | |
| 6,600,121 B1 | 7/2003 | Olodort et al. | |
| 6,816,156 B2* | 11/2004 | Sukeno | G09G 5/10 345/204 |
| 7,016,711 B2 | 3/2006 | Kurakane | |
| 7,228,111 B2 | 6/2007 | Cheng et al. | |
| 7,404,682 B2 | 7/2008 | Dombrowski et al. | |
| 7,834,090 B2 | 11/2010 | Feng et al. | |
| 8,218,306 B2 | 7/2012 | Lynch et al. | |
| 8,368,643 B2 | 2/2013 | Dabov et al. | |
| 8,610,822 B2* | 12/2013 | Weber | G03B 17/02 348/374 |
| 9,591,212 B1* | 3/2017 | Evans, V | H04N 5/23225 |
| 2004/0127267 A1 | 7/2004 | Wong et al. | |
| 2005/0014527 A1 | 1/2005 | Chambers et al. | |
| 2006/0121502 A1 | 6/2006 | Cain et al. | |
| 2006/0279652 A1* | 12/2006 | Yang | H04M 1/0264 348/333.01 |
| 2007/0002130 A1* | 1/2007 | Hartkop | H04N 7/141 348/14.16 |
| 2007/0013802 A1* | 1/2007 | Yang Chen | H04M 1/0264 348/333.01 |
| 2007/0031134 A1* | 2/2007 | Kuroda | G02B 13/0035 396/55 |
| 2007/0298849 A1 | 12/2007 | Kang et al. | |
| 2008/0052945 A1* | 3/2008 | Matas | G06F 3/0485 34/173 |
| 2008/0064437 A1 | 3/2008 | Chambers et al. | |
| 2008/0073186 A1 | 3/2008 | Kenmochi et al. | |
| 2008/0074329 A1 | 3/2008 | Caballero et al. | |
| 2008/0238725 A1 | 10/2008 | Gitzinger et al. | |
| 2008/0316116 A1 | 12/2008 | Hobson et al. | |
| 2009/0002797 A1* | 1/2009 | Kwong | H04N 5/2259 359/225.1 |
| 2009/0009628 A1* | 1/2009 | Janicek | H04N 7/144 348/231.99 |
| 2009/0040042 A1 | 2/2009 | Lontka et al. | |
| 2009/0061145 A1 | 3/2009 | Lin et al. | |
| 2009/0228820 A1* | 9/2009 | Kim | G06F 3/04817 715/769 |
| 2009/0247243 A1 | 10/2009 | Chen et al. | |
| 2009/0323262 A1 | 12/2009 | Arita et al. | |
| 2010/0073518 A1* | 3/2010 | Yeh | H04N 5/217 348/231.99 |
| 2010/0307904 A1 | 12/2010 | Yeh et al. | |
| 2011/0063236 A1* | 3/2011 | Arai | G06F 3/0488 345/173 |
| 2011/0157430 A1 | 6/2011 | Hosoya et al. | |
| 2011/0177848 A1 | 7/2011 | Tanabe et al. | |
| 2011/0255259 A1 | 10/2011 | Weber et al. | |
| 2012/0169850 A1 | 7/2012 | Kim et al. | |
| 2014/0132854 A1* | 5/2014 | Wu | G06F 1/169 349/12 |
| 2014/0211041 A1* | 7/2014 | McCrackin | H04N 9/735 348/223.1 |
| 2014/0273641 A1 | 9/2014 | Light et al. | |
| 2014/0340317 A1 | 11/2014 | Rodzeveski et al. | |
| 2015/0065046 A1* | 3/2015 | Wilfred | G06F 3/041 455/41.2 |
| 2015/0177865 A1* | 6/2015 | Rodzevski | G06F 3/042 345/175 |
| 2015/0189175 A1 | 7/2015 | Fan et al. | |
| 2015/0277720 A1 | 10/2015 | Thorson et al. | |
| 2015/0378592 A1* | 12/2015 | Kim | G06F 1/1628 715/765 |
| 2016/0021998 A1 | 1/2016 | Fathollahi et al. | |
| 2016/0150156 A1* | 5/2016 | Okumura | H04N 5/2253 348/36 |
| 2016/0286115 A1 | 9/2016 | Levy et al. | |
| 2016/0314374 A1* | 10/2016 | Braumandl | G07D 7/121 |
| 2017/0018007 A1 | 1/2017 | DeFrank | |
| 2017/0060485 A1* | 3/2017 | Krilivsky | G06Q 30/0621 |

OTHER PUBLICATIONS

Final Office Action dated May 17, 2017, for U.S. Appl. No. 15/288,962 re Evans V, D., et al., filed Oct. 7, 2016.

International Search Report and Written Opinion dated May 11, 2017, for PCT Application No. PCT/US16/59155.

International Search Report and Written Opinion dated May 5, 2017, for PCT Application No. PCT/US16/59176.

Non-Final Office Action dated May 31, 2017, for U.S. Appl. No. 15/404,830 of Evans V, D., et al., filed Oct. 7, 2016.

Notice of Allowance dated May 9, 2017, for U.S. Appl. No. 15/090,574 of Evans et al. filed Apr. 4, 2016.

Supplemental Notice of Allowability dated May 10, 2017, for U.S. Appl. No. 15/140,444 of Evans et al. filed Apr. 27, 2016.

Corrected Notice of Allowability dated Jun. 16, 2017, for U.S. Appl. No. 15/090,574 of Evans et al. filed Apr. 4, 2016.

* cited by examiner

APPARATUS AND METHOD TO MAXIMIZE THE DISPLAY AREA OF A MOBILE DEVICE

CROSS-REFERENCE TO RELATED APPLICATIONS

This application claims priority to the: U.S. Provisional Patent Application Ser. No. 62/249,130, filed Oct. 30, 2015; U.S. Provisional Patent Application Ser. No. 62/300,631, filed Feb. 26, 2016; U.S. Provisional Patent Application Ser. No. 62/318,152, filed Apr. 4, 2016; all of which are incorporated herein by reference in their entirety.

TECHNICAL FIELD

The present application is related to mobile devices, and more specifically to methods and systems that maximize a display area associated with the mobile device by varying camera placement on the mobile device.

BACKGROUND

Many mobile devices contain a front facing camera placed on the front side of the mobile device, the same side occupied by the mobile device display screen. The mobile device screen does not occupy the full front side of the mobile device because the top and bottom parts of the front side are taken up by the camera and other devices. As a result, the size of the mobile device display screen is reduced.

SUMMARY

The technology disclosed here maximizes the size of the display area associated with the mobile device by various camera placements. In one embodiment, the camera is placed inside the mobile device, and can be extended outside the mobile device when the camera is activated. In embodiments of the invention the camera can be any of a front facing camera, a back facing camera, a 360° camera, etc. When the camera is inactive the camera is retracted inside the mobile device, and is unnoticeable to the user. In another embodiment, the camera is integrated into the mobile device display as a camera icon. The integrated camera serves two purposes: to record pictures, and to act as a camera icon, that, when selected, activates the camera.

In conventional designs, the mobile device screen does not occupy the full front side of the mobile device because the top and bottom parts of the front side of the mobile device are taken up by the camera and other devices. By removing the camera from the front side of the mobile device, or by integrating the camera into the display screen of the mobile device, the size of the display screen of the mobile device can be increased.

DETAILED DESCRIPTION

The technology disclosed here maximizes the size of the display area associated with the mobile device by various camera placements. In one embodiment, the camera is placed inside the mobile device, and can be extended outside the mobile device when the camera is activated. In embodiments of the invention the camera can be any of a front facing camera, a back facing camera, a 360° camera, etc. When the camera is inactive the camera is retracted inside the mobile device, and is unnoticeable to the user. In another embodiment, the camera is integrated into the mobile device display as a camera icon. The integrated camera serves two purposes: to record pictures, and to act as a camera icon, that, when selected, activates the camera.

In conventional designs, the mobile device screen does not occupy the full front side of the mobile device because the top and bottom parts of the front side of the mobile device are taken up by the camera and other devices. By removing the camera from the front side of the mobile device, or by integrating the camera into the display screen of the mobile device, the size of the display screen of the mobile device can be increased.

In various embodiments disclosed herein, the mobile device can have a plurality of cameras, where the plurality of cameras comprises one or more camera embodiments disclosed here.

Camera

Figure 1:
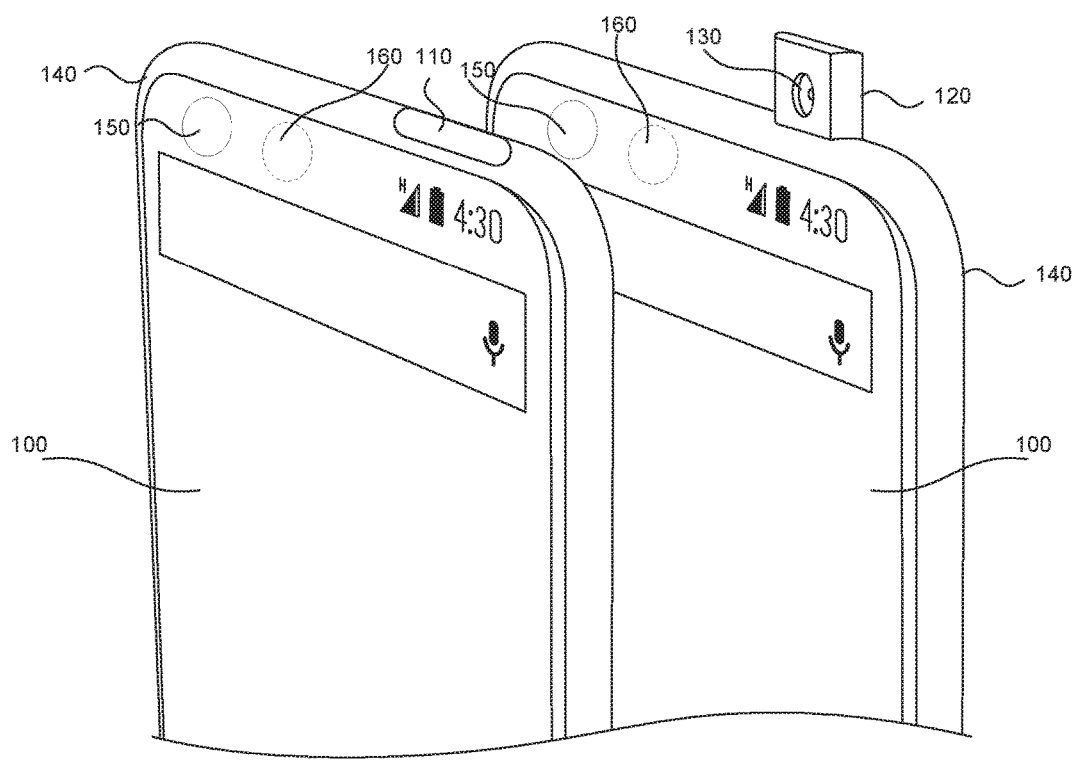
FIG. 1 shows an activate and an inactive camera associated with the mobile device, according to one embodiment.

FIG. 1 shows an active and an inactive camera associated with the mobile device 100, according to one embodiment. The mobile device 100 includes an outer casing 140 associated with the mobile device, a camera port 110 associated with the mobile device, and a camera 120 coupled to the camera port. The outer casing 140 includes a plurality of surfaces, such as the six sides of a traditional smart phone, such as an iPhone, or an Android phone. The camera port 110 can be aligned with one or more of the plurality of surfaces associated with the outer casing 140, i.e., the camera can be placed anywhere on the mobile device, such as the top of the mobile device, the bottom of the mobile device, or any of the mobile device sides. The camera comprises at least one aperture 130. The aperture 130 can comprise various lenses ranging from an extremely long effective focal length lens, an extremely short effective focal length lens, a normal lens, etc. The camera 120 is operable to, when the camera is inactive, retract inside the camera port 110, and align with each surface in the plurality of surfaces associated with outer casing 140, so that the camera 120 becomes unnoticeable when inactive. The camera 120 is operable to, when the camera is active, protrude from the outer casing 140 associated with the mobile device, and position the aperture 130 to receive light mostly unobstructed by the mobile device.

According to another embodiment, the mobile device 100 comprises a front facing camera 150, or a back facing camera 160, in addition to the camera 120. There can be a plurality of front facing cameras such as the front facing camera 150, plurality of back facing cameras such as the back facing camera 160, and/or a plurality of the extended cameras such as the camera 120. The front facing camera 150 can be a camera integrated into the mobile device display, as described herein, or can be a traditional front facing camera.

According to one embodiment, the camera 120 moves linearly inside the camera port 110. The linear motion can be achieved using a linear guide, rack and pinion, a spring, etc. By placing the front facing camera inside the camera port, the display screen area can be increased to utilize the area traditionally associated with the camera in a mobile device 100 such as a smart phone, a tablet, a portable computer, etc.

According to another embodiment, the camera 120 can be a stand-alone camera, attached to the mobile device as an accessory.

Figure 2:
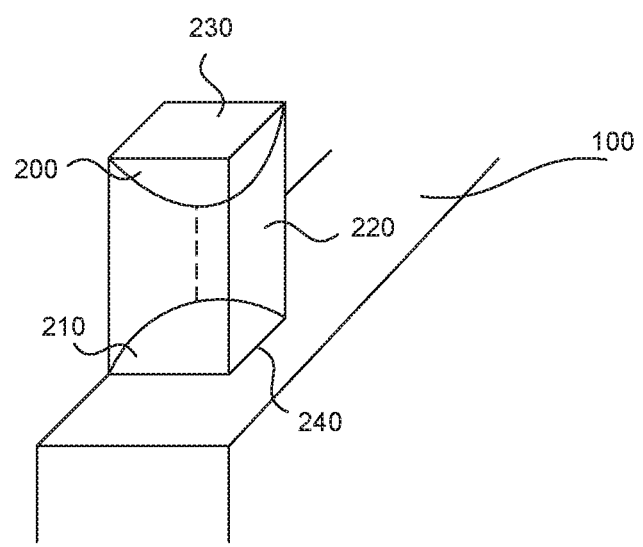
FIG. 2 shows an activated camera associated with the mobile device including a 360° lens, according to one embodiment.

FIG. 2 shows an activated camera associated with the mobile device 100 including a 360° lens, according to one embodiment. The lens can comprise a top lens 200, and a bottom lens 210, and transparent casing 220. The top lens 200 receives light beams beneath the plane 230. The bottom lens 210 receives light beams above the plane 240. According to another embodiment, the lens can comprise a single 360° lens. A light guide, by totally, or nearly totally, internally reflecting the received light, transmits the light received by the single 360° lens to the photo sensors associated with the camera 120. The light guide can also include additional lenses to focus the light before the lights reaches the photo sensors.

Figure 3A:
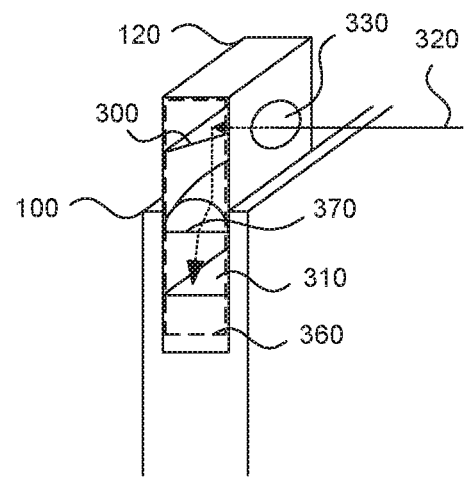
FIGS. 3A-B show a front and a back view of an active camera comprising a plurality of apertures, according to one embodiment.
Figure 3B:
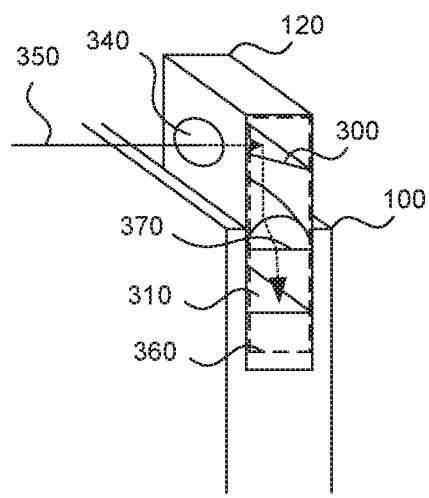

FIGS. 3A-B show a front and a back view of an active camera 120 comprising a plurality of apertures, according to one embodiment. The camera 120 associated with the mobile device 100 includes a first aperture 330, a second aperture 340, a plurality of photo sensors 310, and an optical element 300 coupled to the first aperture 330, the second aperture 340, and the plurality of photo sensors 310. The first aperture 330 and/or the second aperture 340 can be lenses having any focal length, from extremely short effective focal length, to extremely long effective focal length. In one embodiment, the first and/or the second lens can have up to 220° angle of view.

The optical element 300 is operable to change a direction of a light beam 320, 350 by changing the optical element's position. The change in the direction of the light beam 320, 350 can be from 0° to 180°. The optical element 300 is operable to assume at least a first position, as shown in FIG. 3A, and a second position, as shown in FIG. 3B. The first position is operable to direct a light beam 320 associated with the first aperture 330 to the photo sensors 310 associated with the camera 120, and the second position is operable to direct the light beam 350 associated with the second aperture 340 to the photo sensors 310 associated with the camera 120. The optical element 300 can be a mirror or a prism operable to reflect light, and/or refract light. The mirror can be made out of any reflective material, such as glass, reflective plastic, metal, etc. The prism can be a Porro prism, Amici roof prism, pentaprism, etc. The optical element 300 can be actuated by, or can be a part of a very small device, such as a micro-electromechanical systems ("MEMS") device, a nano-electromechanical systems ("NEMS") device, a pico-electromechanical systems device, etc.

In addition to the first and second apertures 330, 340, as described above, the camera 120 can include a third aperture, a fourth aperture, a fifth aperture, etc. Each aperture can correspond to a side of the camera 120. In addition to the first and second position, as described above, the optical element 300 is operable to assume a third position, a fourth position, a fifth position, etc., where each optical element position is configured to direct a light beam associated with an aperture to the photo sensors 310 associated with the camera. Any one of the optical element positions can direct the light by 0°, i.e., the optical element 300 lets the light beam through to the photo sensors 310.

According to one embodiment, the camera 120 can include a lens 370 disposed between the plurality of photo sensors 310 and the optical element 300. The lens 370 can have an effective focal length between an extremely short effective focal length and an extremely long effective focal length. In another embodiment, the camera 120 can further include a light guide 360 connecting the apertures 330, 340, the lens 370, the optical element 300, and the plurality of photo sensors 310, where the light guide 360 is operable to transmit a beam of light 320, 350 between the apertures 330, 340 and the lens 370. The light guide 360 can be made of any material that totally, or nearly totally, internally reflects light. As described above, the apertures 330, 340 can also be various lenses.

According to another embodiment, the mobile device 100 can include a second camera, where the second camera is displaced a short distance from the camera 120. In various embodiments, the short distance between the two cameras roughly corresponds to the distance between a person's eyes, and in some cases mimics the distance between a person's eyes. In other embodiments, the short distance between the two cameras is reduced to almost zero, to minimize the space that the two cameras occupy on the mobile device 100. The second camera includes a second lens operable to capture a second image. The second image corresponds to a first image captured by the camera 120, where the second image and the first image comprise stereoscopic images. Stereoscopic images are two-dimensional images of the same scene, slightly offset, and corresponding to the left and the right eye of a viewer. When the two images are viewed by a person, the images give the impression of depth. Further, the captured images can include depth information associated with the scene. The second camera can be a second extendable camera, can be a traditional cell phone camera, can be a cell phone camera integrated into the display, as described in this application, etc. The mobile device 100 includes a processor coupled to the second camera and the camera 120. The processor is operable to extract depth information based on the first image and the second image, to correct aberrations in each image, to rectify images, to create stereoscopic images, and perform other depth related processes.

In other embodiments, additional cameras, such as a third, fourth, fifth, etc. camera, can be used to capture third, fourth, fifth, etc. image of the scene. The additional cameras can be extendable cameras, can be traditional cell phone cameras, can be cell phone cameras integrated into the display as described herein, etc. The additional cameras can be arranged in a regular pattern throughout the outer casing associated with the mobile device.

Figure 4:
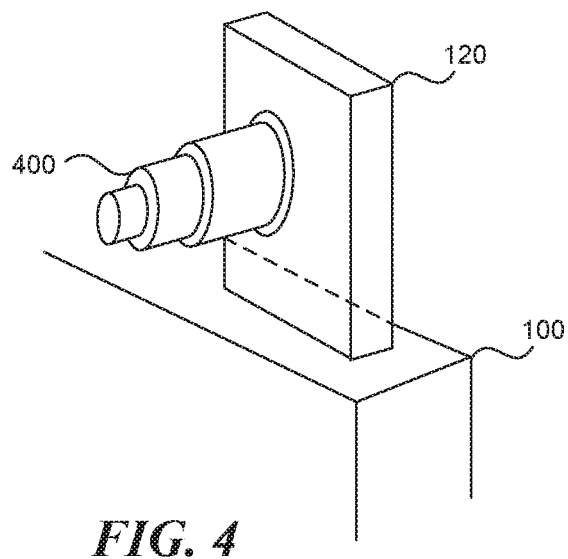
FIG. 4 shows a folded optical zoom lens associated with the camera, according to one embodiment.

FIG. 4 shows a folded optical zoom lens associated with the camera 120, according to one embodiment. The optical zoom lens 400 can be extended when the camera 120 is active, or can be completely retracted to fit inside the camera port, when the camera 120 is inactive. Various lenses disclosed in the current application can also include a folded optical zoom lens.

According to another embodiment, the camera 120 can be an articulated fiber optic camera, wherein the articulated fiber optic camera is operable to be steered 360°. The lens associated with a fiber optic camera can have an effective focal length from an extremely short effective focal length to an extremely long effective focal length.

In another embodiment, the various cameras disclosed herein further comprise a flash, such as a light emitting diode ("LED") flash.

Figure 5:
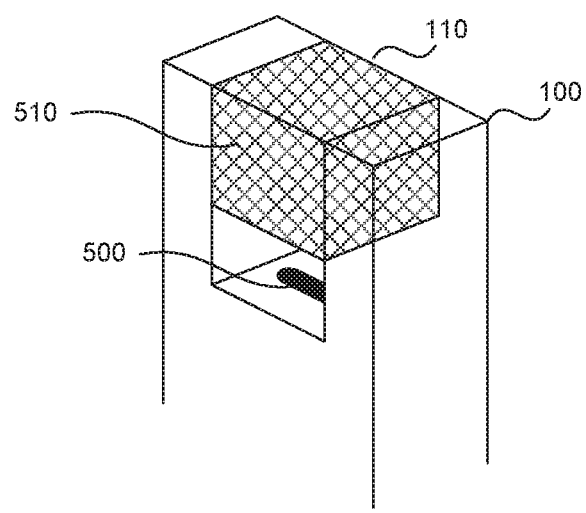
FIG. 5 shows the camera port comprising additional accessories associated with the mobile device, according to one embodiment.

FIG. 5 shows the camera port 110 comprising additional accessories 500 associated with the mobile device, according to one embodiment. Element 510 is the camera 120 retracted into the camera port 110. The camera port 110, in addition can include a subscriber identity module ("SIM") card, or a memory card, such as Secure Digital ("SD") card. By combining additional accessories 500 into the camera port 110, the number of ports associated with the mobile device 100 are reduced, thus reducing the cost of manufacturing the mobile device 100, and reducing the risk of foreign substances, such as water or dust, contaminating the mobile device electronic circuitry.

In many of the embodiments disclosed here, the camera 120, 510 can be removable whether the camera is active or inactive. The mobile device 100 is operable to close off the camera port 110, so that the mobile device 100 appears as if the camera 120 is inactive.

The camera 120 disclosed here can be activated in a variety of ways such as via a software associated with the mobile device, a dedicated button associated with the mobile device, a voice activation, a gesture, or a power button associated with the mobile device. The gesture can be a motion associated with the whole mobile device, such as a quick motion downwards, a shake of the mobile device, a tilting of the mobile device, etc. The gesture can also be associated with the display screen of the mobile device, such as a swipe upwards, a selection of a camera icon, etc. The power button can be configured to serve a dual purpose, namely, to power off the phone, and to toggle the camera between active and inactive state. For example, the power button can turn the phone off when the power button receives long-press as input, and the power button can toggle the states of the camera between active and inactive, when the power button receives a short-press as input.

Figure 6:
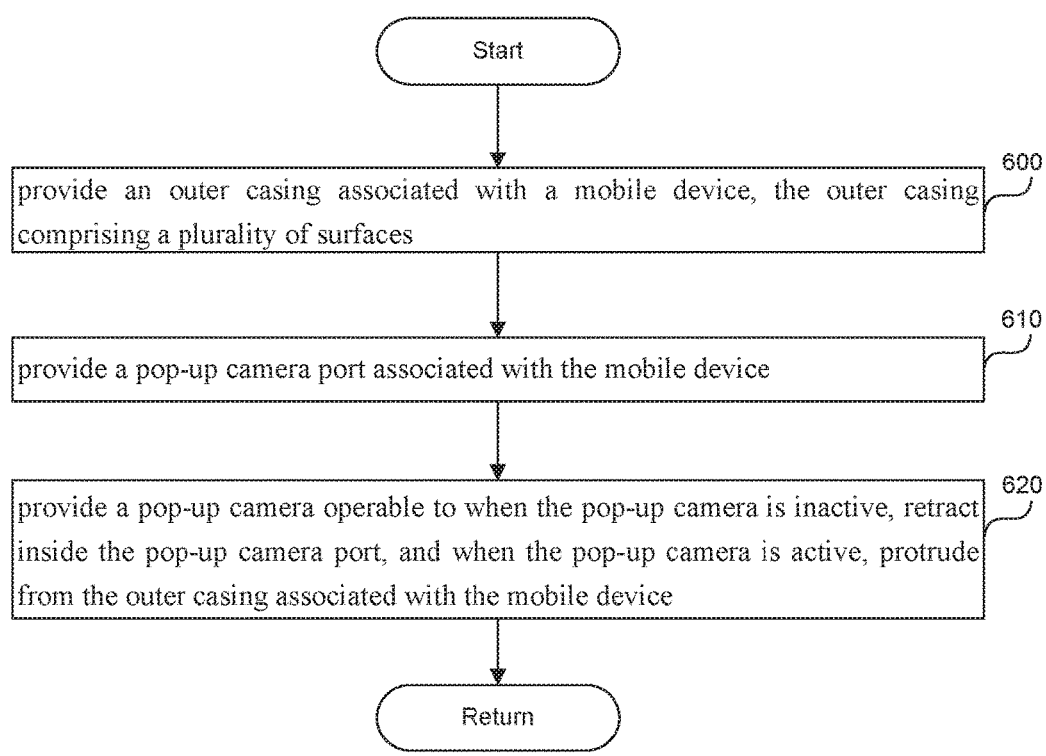
FIG. 6 is a flowchart of a method to provide a camera, associated with the mobile device 100, according to one embodiment.

FIG. 6 is a flowchart of a method to provide a camera 120, associated with the mobile device 100, according to one embodiment. In step 600, an outer casing 140 associated with the mobile device 100 is provided, where the outer casing includes a plurality of surfaces. In step 610, a camera port 110 associated with the mobile device 100 is provided. In step 620, the camera 120 is coupled to the camera port 110. The camera 120 comprises an aperture 130. When the camera 120 is inactive, the camera 120 retracts inside the camera port 110, and aligns with each surface in the plurality of surfaces associated with the outer casing 140. When the camera 120 is active, the camera 120 protrudes from the outer casing 140 associated with the mobile device 100, and positions the aperture 130 to receive light unobstructed by the mobile device 100. In various embodiments, additional method steps can be performed to enable the creation of the embodiments described above.

Camera Integrated into the Display

Figure 7A:
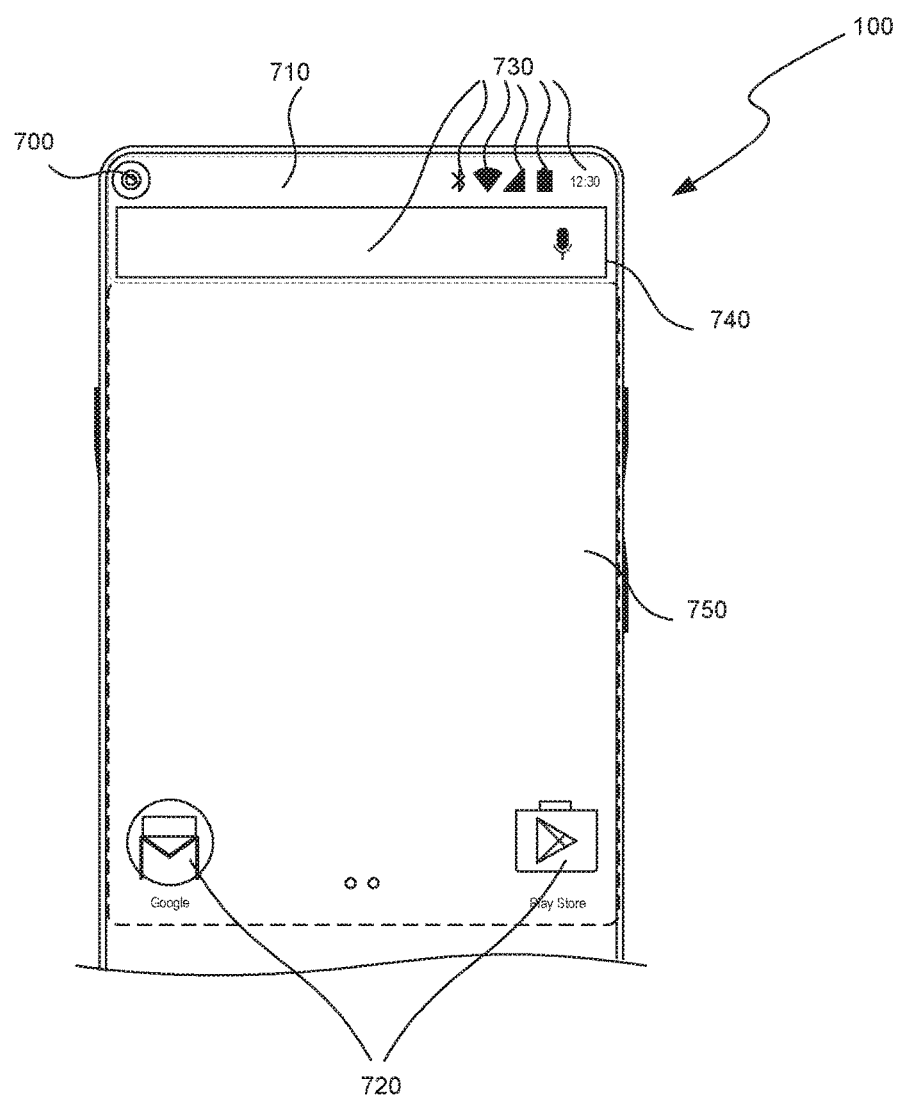
FIG. 7A shows a front facing camera integrated into the display screen associated with the mobile device, according to one embodiment.

FIG. 7A shows a front facing camera 700 integrated into the display screen 710 associated with the mobile device 100, according to one embodiment. The display screen 710 associated with the mobile device 100 comprises a plurality of icons corresponding to: a plurality of mobile device software applications 720, and a plurality of mobile device operating system functions 730. The camera 700, coupled to the mobile device 100, occupies a portion of the display screen 710. The display screen 710 can occupy the whole outer surface of the device 100, or can occupy one whole side of the device 100, as shown in FIG. 7. The portion of the display screen occupied by the camera is operable to act as a camera icon in the plurality of icons, so that the camera 700 is activated when the camera icon 700 is selected. The camera icon 700 can be placed in a portion of the display screen 740 reserved for the mobile device operating system functions, or can be placed in a portion of the display screen 750 associated with the mobile device software applications. The camera icon 700 can be selected by touch, or can be voice activated. When the camera icon 700 is selected, the camera icon 700 can be operable to perform a variety of functions, such as launching a camera application on the mobile device, taking a picture, etc. By integrating the camera 700 into the display, the area of the display screen is increased because the camera acts as both a camera operable to record an image, and a camera icon operable to activate the camera.

According to another embodiment, the camera can be an articulated fiber optic camera, wherein the articulated fiber optic camera is operable to be steered in a plurality of directions. The outer casing associated with the mobile device can have a plurality of openings such as a front facing, back facing, left facing, right facing, or top facing opening. The fiber optic camera can be steered to receive light beams through any of the plurality of openings associated with the outer casing. In one embodiment, the fiber optic camera can be a front facing, a back facing, a left facing, a right facing, or a top facing camera. The lens associated with a fiber optic camera can have a focal length from an extremely short effective focal length to an extremely long effective focal length.

Figure 7B:
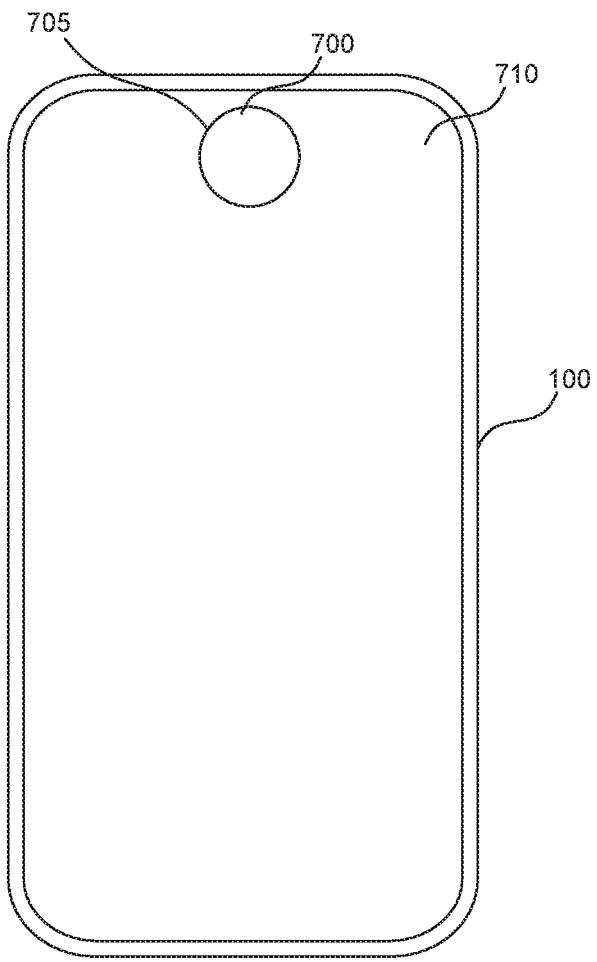
FIG. 7B shows a front facing camera integrated into the display screen associated with the mobile device, according to another embodiment.

FIG. 7B shows a front facing camera 700 integrated into the display screen 710 associated with the mobile device 100, according to another embodiment. In various embodiments disclosed herein, the mobile device 100 can take on various shapes such as a cuboid shape, a cuboid shape with rounded edges, an ellipsoid, a curved close surface, etc. Regardless of the shape, the mobile device 100 includes an outer surface. In various embodiments disclosed herein, the display screen 710 occupies substantially the whole outer surface associated with the mobile device 100. When the mobile device shape includes a plurality of sides, such as when the mobile device 100 is shaped as a cuboid, or a cuboid with rounded edges, and the display screen 710 is associated with one or more sides in the plurality of sides, the display screen 710 occupies substantially all the sides with which of the display screen 710 is associated.

In various embodiments disclosed herein, the camera 700 can be placed anywhere on the display screen 710, such as the upper right corner, the lower left corner, middle of the screen, middle of the upper edge associated with the display screen, etc.

In one embodiment, the border 705 between the camera 700 and the display screen 710 is perimeter associated with the camera 700. The camera 700 and border 705 can take on various shapes such as a circle, a rectangle, a square, an ellipse, a curved shape, an open curved line, etc.

Figure 7C:
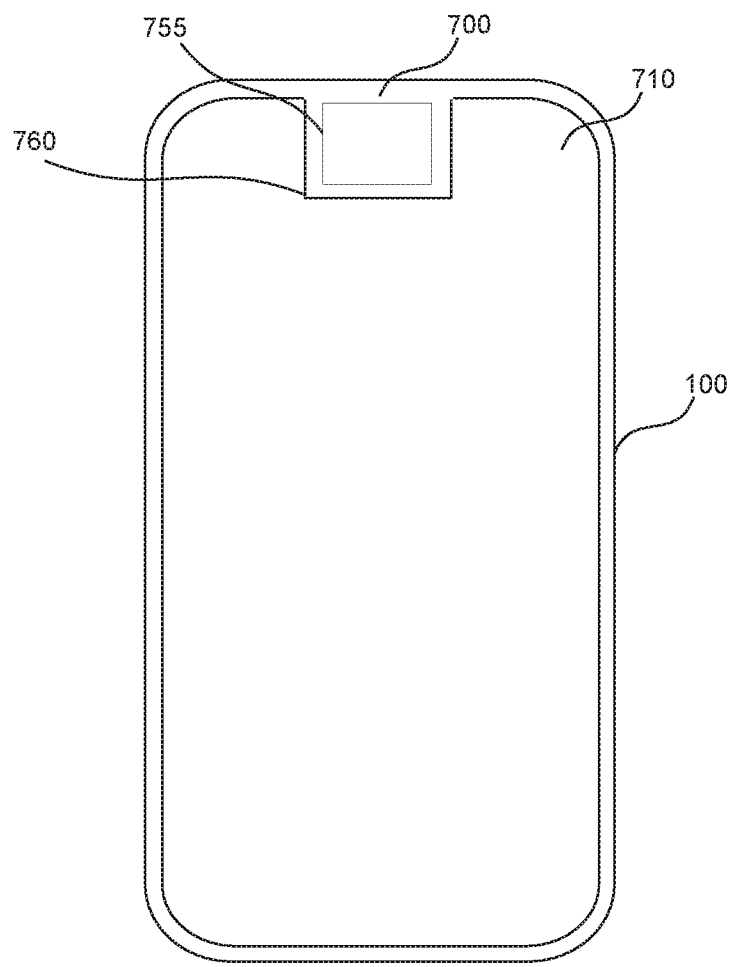
FIGS. 7C-7E show borders between the camera 700, and the display screen 710, according to various embodiments.
Figure 7D:
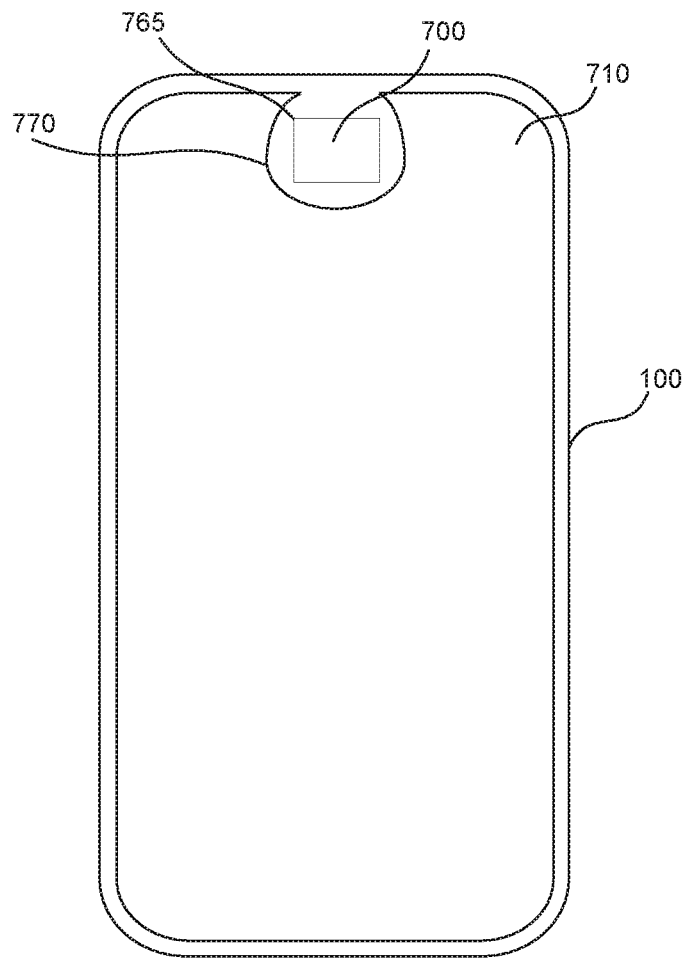
Figure 7E:
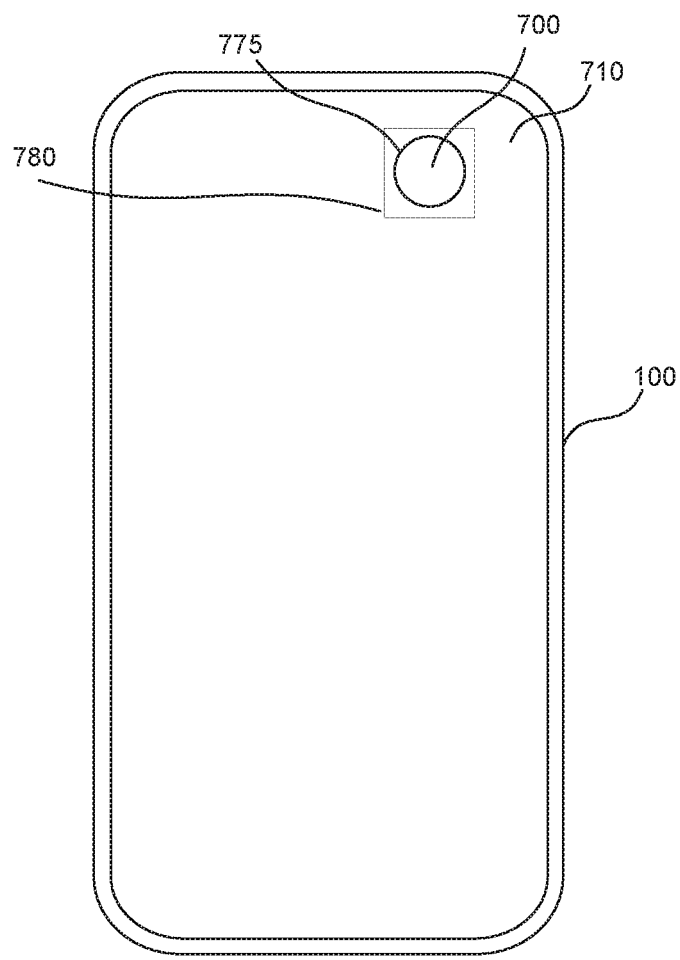

FIGS. 7C-7E show borders between the camera 700, and the display screen 710, according to various embodiments. In various embodiments disclosed herein, the camera 700, the perimeter 705, 755, 765, 775 associated with the camera 710, and the border 705, 760, 770, 780 between the camera 700 and the display screen 710 can take on various shapes such as a circle, a rectangle, a square, an ellipse, a curved shape, an open curved line, etc. The shapes of the perimeter 755, 765, 775 and the border 760, 770, 780 can have parallel lines, but do not necessarily have to have parallel lines. FIGS. 7D-7E show an example where the perimeter 765, 775 and the border 770, 780 do not have parallel lines. For example, FIG. 7D shows the border 770 having a shape of an open curved line, while the perimeter 765 associated with the camera 700 has a rectangular shape. Similarly, FIG. 7E shows the border 780 having a square shape, while the perimeter 775 associate with the camera 700 has a circular shape. FIG. 7C shows an example where the perimeter 755 and the border 760 do have parallel lines.

Further, the border 760, 770, 780 between the camera 700 and the display screen 710 can enclose the perimeter 755, 765, 775 associated with the camera 710 to various degrees. FIGS. 7C-7D show the border 760, 770 partially enclosing the perimeter 755, 765. For example, in FIG. 7C the border 760 encloses the perimeter 755 on three sides. In FIG. 7D, the border 770 partially encloses the perimeter 765 on more than three sides, however the border 770 does not fully enclose the perimeter 765. FIG. 7E shows the border 780 fully enclosing the perimeter 775.

Figure 8:
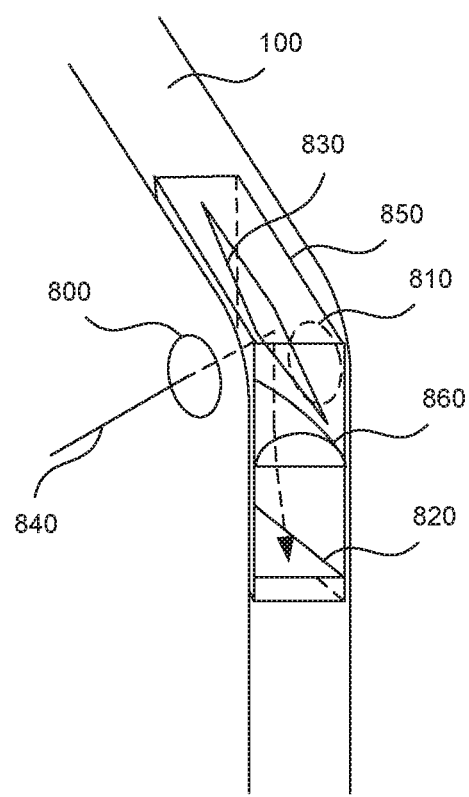
FIG. 8 shows a camera integrated into the display, according to one embodiment.

FIG. 8 shows a camera 700 integrated into the display, according to one embodiment. The camera comprises a front aperture 800 occupying the portion of the display screen, a back aperture 810 disposed in a direction opposite of the front aperture 800, a plurality of photo sensors 820, and an optical element 830 coupled to the front aperture 800, the back aperture 810, and the plurality of photo sensors 820. The front aperture 800 and/or the back aperture 810 can comprise lenses that can have any effective focal length, from extremely short effective focal length, to extremely long effective focal length. In one embodiment, the front and/or the back lens can have up to 220° angle of view. In one embodiment, the front and/or the back lens can be a folded optical zoom lens, as depicted in FIG. 4.

The optical element 830 is operable to change a direction of a light beam 840 by changing the optical element's position. The change in the direction of the light beam 840 can be from 0° to 180°. The optical element 830 can assume a first position, and a second position, where the first position is configured to direct a light beam associated with the front aperture 800 to the photo sensors 820. The second position is configured to direct the light beam associated with the back aperture 810 to the photo sensors associated with the camera.

The optical element 830 can be a mirror or a prism operable to reflect light, and/or refract light. The mirror can be made out of any reflective material, such as glass, reflective plastic, metal, etc. The prism can be a Porro prism, Amici roof prism, pentaprism, etc. The optical element can be actuated by, or a part of a very small device, such as a micro-electromechanical systems ("MEMS") device, a nano-electromechanical systems ("NEMS") device, a pico-electromechanical systems device, etc.

According to one embodiment, the camera can include a lens 860 disposed between the plurality of photo sensors 820 and the optical element 830. The lens 860 can have any effective focal length between an extremely short effective focal length and an extremely long effective focal length. In another embodiment, the camera can further include a light guide 850 connecting the apertures 800, 810, the optical element 830, the lens 860, and the plurality of photo sensors 820, where the light guide 850 is operable to transmit a beam of light 840 between the apertures 800, 810 and the lens 860. The light guide 850 can be made of any material that totally, or nearly totally, internally reflects light. As described above, the apertures 800, 810 can also include various lenses.

In various embodiments disclosed herein there can be a plurality of front facing cameras such as the camera 700. According to one embodiment, the mobile device 100 can include a second camera, where the second camera is displaced a short distance from the camera 700. In various embodiments, the short distance between the two cameras roughly corresponds to the distance between a person's eyes, and in some cases mimics the distance between a person's eyes. In other embodiments, the short distance between the two cameras is reduced to almost zero, to minimize the space that the two cameras occupy on the mobile device 100. The second camera includes a second lens operable to capture a second image. The second image corresponds to a first image captured by the camera 700, where the second image and the first image comprise stereoscopic images. Further, the first and the second image can include depth information associated with the scene. The second camera can be a second extendable camera as described herein, can be a traditional cell phone camera, can be a cell phone camera integrated into the display as described herein, etc. The mobile device 100 includes a processor coupled to the second camera and the camera 120. The processor is operable to extract depth information based on the first image and the second image, to correct aberrations in each image, to rectify images, to create stereoscopic images, and perform other depth related processes.

In other embodiments, additional cameras, such as a third, fourth, fifth, etc. camera, can be used to capture third, fourth, fifth, etc. image of the scene. The additional cameras can be extendable cameras, can be traditional cell phone cameras, can be cell phone cameras integrated into the display as described herein, etc. The additional cameras can be arranged in a regular pattern throughout the outer casing associated with the mobile device.

Figure 9:
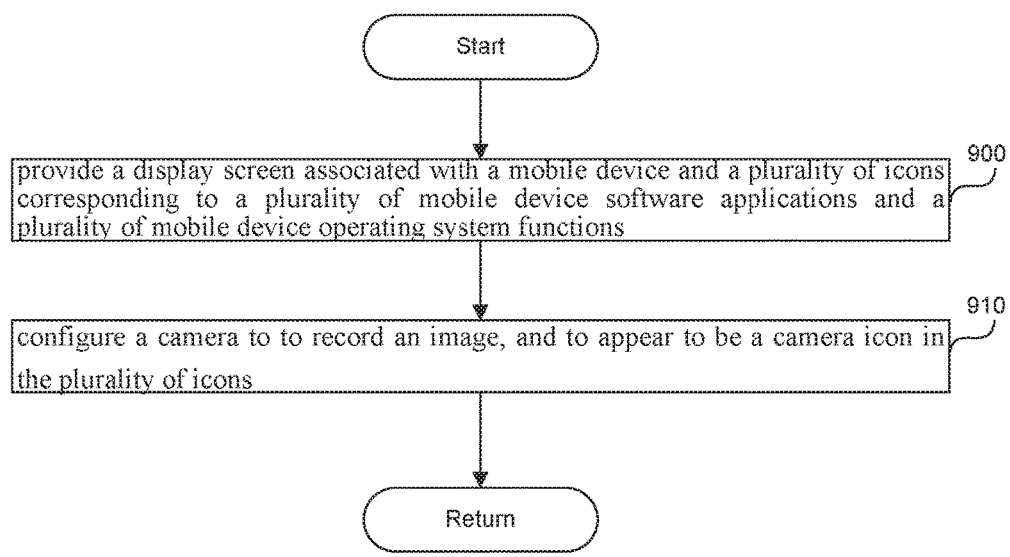
FIG. 9 is a flowchart of a method to integrate a camera into the display screen, according to one embodiment.

FIG. 9 is a flowchart of a method to integrate a camera into the display screen, according to one embodiment. In step 900, a display screen associated with the mobile device 100 is provided, such that the display screen includes a plurality of icons. The plurality of icons corresponds to a plurality of mobile device software applications and a plurality of mobile device operating system functions. In step 910, the camera is configured to record an image, and to appear to be a camera icon in the plurality of icons. The camera icon is configured to activate the camera when the camera icon is selected. The camera can be selected by touch, or can be voice activated. The camera can be a fiber optic camera. In various embodiments, additional method steps can be performed to enable the creation of the embodiments described above.

Computer

Figure 10:
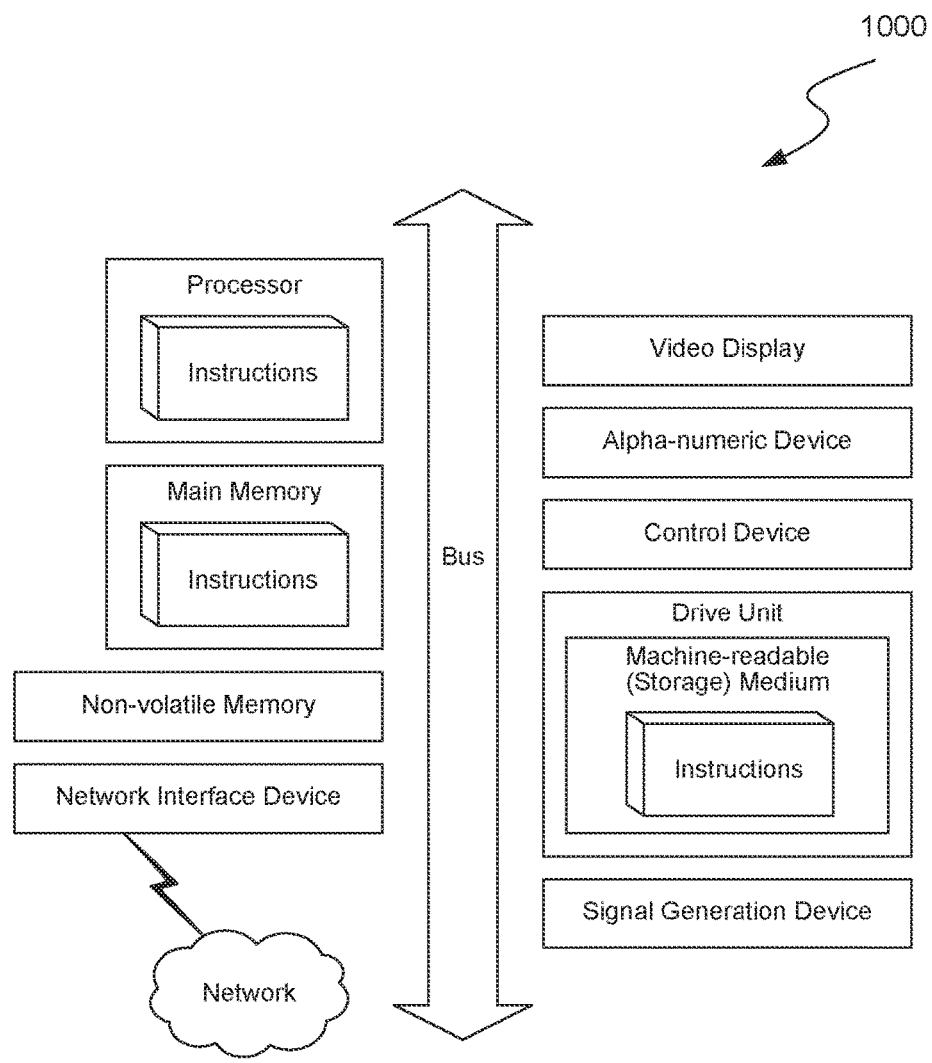
FIG. 10 is a diagrammatic representation of a mobile device in the example form of a computer system within which the above-described apparatus may be implemented, and within which a set of instructions for causing the machine to perform any one or more of the methodologies or modules discussed herein may be executed.

FIG. 10 is a diagrammatic representation of a machine in the example form of a computer system 1000 within which a set of instructions, for causing the machine to perform any one or more of the methodologies or modules discussed herein, may be executed.

In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components described in the example of FIGS. 1-9 (and any other components described in this specification) can be implemented. The computer system 1000 can be of any applicable known or convenient type. The components of the computer system 1000 can be coupled together via a bus or through some other known or convenient device.

This disclosure contemplates the computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

The processor may be, for example, a conventional microprocessor such as an Intel Pentium microprocessor or Motorola PowerPC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A mobile device, comprising:
   a display screen associated with the mobile device, the display screen comprising a plurality of light emitting elements, and further the display screen comprising a plurality of icons, the plurality of icons corresponding to a plurality of mobile device software applications and a plurality of mobile device operating system functions; and
   a camera associated with the mobile device, the camera operable to record an image, the camera comprising:

a front aperture occupying a portion of the display screen reserved for the plurality of mobile device operating system functions, the display screen surrounding the front aperture comprising the plurality of light emitting elements, the portion of the display screen occupied by the front aperture functioning as both a camera icon in the plurality of icons and a physical camera, the portion of the screen occupied by the camera icon operable to activate the camera when selected;

a back aperture disposed in a direction opposite of the front aperture;

a plurality of photo sensors; and an optical element associated with the front aperture, the back aperture, and the plurality of photo sensors, the optical element changing a direction of a light beam, the optical element operable to assume a first position, and a second position, the first position directing a light beam associated with the front aperture to the plurality of photo sensors associated with the camera, and the second position directing a light beam associated with the back aperture to the plurality of photo sensors associated with the camera.

2. The mobile device of claim 1, the front aperture and the back aperture comprising a front lens and a back lens, respectively.

3. The mobile device of claim 2, the front lens and the back lens comprising a wide angle lens receiving light up to 220 degrees around the wide angle lens.

4. The mobile device of claim 1, the camera further comprising:

a lens disposed between the plurality of photo sensors and the optical element; and a light guide connecting the apertures, the optical element, and the plurality of photo sensors, the light guide transmitting a beam of light between the apertures and the lens.

5. The mobile device of claim 1, the camera comprising a micro-electromechanical systems device operable to actuate the optical element.

6. A mobile device, comprising:

a display screen associated with the mobile device, the display screen comprising a plurality of light emitting elements, and further the display screen comprising a plurality of icons, the plurality of icons corresponding to a plurality of mobile device software applications and a plurality of mobile device operating system functions; and a camera associated with the mobile device, the camera operable to record an image, the camera occupying a portion of the display screen, the display screen surrounding the camera comprising the plurality of light emitting elements, the portion of the display screen occupied by the camera functioning as both a camera icon in the plurality of icons and a physical camera, the portion of the screen occupied by the camera icon operable to activate the camera when the camera icon is selected.

7. The mobile device of claim 6, the mobile device comprising an outer surface, the display screen occupying substantially the whole outer surface associated with the mobile device.

8. The mobile device of claim 6, the mobile device comprising a plurality of sides, the display screen associated with a side in the plurality of sides, the display screen occupying substantially the whole side in the plurality of sides.

9. The mobile device of claim 6, comprising a border between the camera and the display screen, the border comprising a perimeter associated with the camera.

10. The mobile device of claim 6, comprising a border between the camera and the display screen, the border comprising an outline partially enclosing a perimeter associated with the camera.

11. The mobile device of claim 6, the camera icon disposed in a portion of the display screen reserved for the plurality of mobile device operating system functions.

12. The mobile device of claim 6, the camera icon operable to launch a camera application on the mobile device when the camera icon is selected.

13. The mobile device of claim 6, the camera icon operable to take a picture when the camera icon is selected.

14. The mobile device of claim 6, the camera icon disposed in a portion of the display screen associated with the plurality of mobile device software applications.

15. The mobile device of claim 6, further comprising:

a second camera associated with the mobile device, the second camera displaced a short distance from the camera, the second camera operable to record a second image corresponding to a first image captured by the camera; and a processor coupled to the second camera and the camera, the processor operable to create stereoscopic images based on the first image and the second image.

16. The mobile device of claim 6, the camera comprising:

a front aperture occupying the portion of the display screen;

a back aperture disposed in a direction opposite of the front aperture;

a plurality of photo sensors; and an optical element associated with the front aperture, the back aperture, and the plurality of photo sensors, the optical element changing a direction of a light beam, the optical element operable to assume a first position, and a second position, the first position directing a light beam associated with the front aperture to the plurality of photo sensors associated with the camera, and the second position directing a light beam associated with the back aperture to the plurality of photo sensors associated with the camera.

17. The mobile device of claim 16, the front aperture and the back aperture comprising a front lens and a back lens, respectively.

18. The mobile device of claim 17, the front lens and the back lens comprising a wide angle lens receiving light up to 220 degrees around the wide angle lens.

19. The mobile device of claim 16, the camera further comprising:

a lens disposed between the plurality of photo sensors and the optical element; and a light guide connecting the apertures, the optical element, and the plurality of photo sensors, the light guide transmitting a beam of light between the apertures and the lens.

20. The mobile device of claim 16, the camera comprising a micro-electromechanical systems device operable to actuate the optical element.

21. The mobile device of claim 16, the optical element comprising a mirror or a prism.

22. A method comprising:
providing a display screen associated with a mobile device, the display screen comprising a plurality of light emitting elements, and further the display screen comprising a plurality of icons, the plurality of icons corresponding to a plurality of mobile device software applications and a plurality of mobile device operating system functions; and
providing a camera associated with the mobile device, the camera operable to record an image, said providing the camera comprising:
configuring a front aperture to occupy a portion of the display screen reserved for the plurality of mobile device operating system functions, the display screen surrounding the front aperture comprising the plurality of light emitting elements, the portion of the display screen occupied by the front aperture functioning as both a camera icon in the plurality of icons and a physical camera, the portion of the screen occupied by the camera icon configured to activate the camera when selected;
providing a back aperture disposed in a direction opposite of the front aperture;
providing a plurality of photo sensors; and
configuring an optical element to assume a first position, and a second position, the first position configured to direct a light beam associated with the front aperture to the plurality of photo sensors associated with the camera, and the second position configured to direct a light beam associated with the back aperture to the plurality of photo sensors associated with the camera.

23. The method of claim 22, wherein the front aperture and the back aperture comprise a front lens and a back lens, respectively.

24. The method of claim 22, further comprising:
providing a lens disposed between the plurality of photo sensors and the optical element; and
configuring a light guide to transmit a beam of light between the apertures and the lens.

25. The method of claim 22, wherein the camera comprises a micro-electromechanical systems device operable to actuate the optical element.

26. A method, comprising:
providing a display screen associated with a mobile device, the display screen comprising a plurality of light emitting elements, and further the display screen comprising a plurality of icons, the plurality of icons corresponding to a plurality of mobile device software applications and a plurality of mobile device operating system functions; and
configuring a camera to record an image, and to occupy a portion of the display screen, the display screen surrounding the camera comprising the plurality of light emitting elements, the portion of the display screen occupied by the camera functioning as both a camera icon in the plurality of icons and a physical camera, the portion of the screen occupied by the camera icon configured to activate the camera when the camera icon is selected.

27. The method of claim 26, wherein the camera icon is disposed in a portion of the display screen reserved for the plurality of mobile device operating system functions.

28. The method of claim 26, further comprising configuring the camera icon to launch a camera application on the mobile device when the camera icon is selected.

29. The method of claim 26, wherein the camera icon is disposed in a portion of the display screen associated with the plurality of mobile device software applications.

30. The method of claim 26, further comprising:
configuring a front aperture to occupy the portion of the display screen;
providing a back aperture disposed in a direction opposite of the front aperture;
providing a plurality of photo sensors; and
configuring an optical element to assume a first position, and a second position, the first position directing a light beam associated with the front aperture to the plurality of photo sensors associated with the camera, and the second position directing a light beam associated with the back aperture to the plurality of photo sensors associated with the camera.

* * * * *